United States Patent

Konishi et al.

[15] 3,668,492

[45] June 6, 1972

[54] MOTOR DRIVING SERVO SYSTEM COMPRISING AN INTEGRATOR FOR THE QUANTITY RELATING TO THE ERROR SIGNAL

[72] Inventors: Tatsuo Konishi; Masao Inaba, both of Tokyo, Japan

[73] Assignee: Nippon Electric Company, Limited, Tokyo, Japan

[22] Filed: May 20, 1971

[21] Appl. No.: 145,335

[30] Foreign Application Priority Data

May 23, 1970 Japan....................................45/44315
May 23, 1970 Japan....................................45/44316
May 23, 1970 Japan....................................45/44320

[52] U.S. Cl.............................318/314, 318/341, 178/6.6 A
[51] Int. Cl...........................................................G05b 11/42
[58] Field of Search.................318/341, 314, 326; 178/6.6 A

[56] References Cited

UNITED STATES PATENTS

| | | | |
|---|---|---|---|
| 3,424,966 | 1/1969 | Webb | 318/314 |
| 3,495,152 | 2/1970 | Keiser et al. | 318/314 |
| 3,600,508 | 8/1971 | Dann | 318/314 X |
| 3,611,096 | 10/1971 | Sadashige | 318/341 X |

*Primary Examiner*—Benjamin Dobeck
*Attorney*—Sandoe, Hopgood & Calimafde

[57] ABSTRACT

The servo system having a phase comparator for producing an error signal representative of the phase difference between an input reference periodic signal and an oscillatory signal for driving a motor. A voltage controlled oscillator controlled by the error signal to produce the oscillatory signal is provided with an integrator for integrating the error signal to produce an integration signal proportional to the result of the integration of the error signal and therefore to hold the instantaneous value of the integration signal when the error signal becomes zero. The integration signal is supplied to the oscillator in place of the error signal. the servo system is suitable for the drum and the capstan servos of rotary-head video tape recorders.

12 Claims, 5 Drawing Figures

*INVENTORS*
TATSUO KONISHI
MASAO INABA
by
Sandoe, Hopgood & Calimafde
ATTORNEYS

INVENTORS
TATSUO KONISHI
MASAO INABA
by
Sandoe, Hopgood & Calimafde
ATTORNEYS

MOTOR DRIVING SERVO SYSTEM COMPRISING AN INTEGRATOR FOR THE QUANTITY RELATING TO THE ERROR SIGNAL

This invention relates generally to servo systems, and more particularly to a servo system for driving a motor in a desired phase relation to a reference periodic signal.

This invention will hereafter be described in particular conjunction with the drum and the capstan servos of a quadruplex video tape recorder for recording video signals.

A quadruplex video tape recorder has four magnetic heads mounted in quadrature relationship on a rotatable video head drum which in turn is rotated by a direct-coupled head motor nominally at a speed of 240 Hz (14,400 rpm), for recording or reproducing or playing back the video signals onto or from a magnetic tape recording medium. A detector/generator is coupled to the head motor shaft to detect the phase of rotation of the rotary video head drum and to generate pulses called the tachometer pulses which represent the phase of rotation of the drum. The tape is fed by a capstan driven by a capstan motor, nominally at a speed of 15 inches/second. After the video signal is recorded, the control track signal and the audio signal are recorded on the tape by the respective fixed heads, which also serve to reproduce the control and audio signals. The control track records the framing pulses (30 Hz) of the video signal, the sinusoidal signal which is formed of the tachometer pulses to represent the phase of rotation of the rotary video head drum is called the control track signal (240 Hz).

On recording, the head motor is driven by a head motor driving signal produced by the so-called drum oscillator in synchronism with the vertical synchronizing signal of the video signal being recorded. The synchronism is achieved by a servo loop called the drum servo for controlling the frequency of the drum oscillator and the phase of the driving signal.

For the sake of the interchangeability for the tape (the capability of reproducing by one video tape recorder the tape recorded by another), the tachometer pulses should have a predetermined phase relation to the vertical synchronizing signal of the video signal being recorded, as prescribed by the SMPTE recommended practice (RP–26–1968). On the other hand, the vertical synchronizing signal frequency has an allowance of the order of 1 percent. On recording the video signal, whose vertical synchronizing signal frequency has a deviation, the drum servo must lock the head motor at a speed shifted from 240 Hz. Furthermore, the nominal frequency of the drum oscillator varies with changes in temperature and other ambient conditions. This necessitates the readjustment of the drum servo as will later become clear.

On recording, the a capstan motor is driven by capstan motor driving signal produced by another oscillator called the capstan oscillator in synchronism with the tachometer pulses. This is attained by another servo loop called the capstan servo which locks the frequency of the capstan motor driving signal by the tachometer pulses. As in the drum servo, deviation in the frequency of the vertical synchronizing signal being recorded and in the nominal frequency of the capstan oscillator for the capstan motor driving signal necessitate readjustment of the capstan servo.

On reproduction or play back, the capstan motor must feed the tape in such a manner that the rotary video heads may perform correct tracing (tracking) of the video-signal tracks. This is also accomplished by the capstan servo to drive the capstan motor in such a manner that the tachometer pulses being produced may be in synchronism with the control track signal being reproduced. On play back, the capstan servo will not give rise to appreciable problems. On reproduction and specifically on interchange reproduction, the drive of the capstan motor at the nominal rate will not necessarily feed the tape at the velocity at which the signals are recorded, because of the possible slight differences in the capstan diameter, the relative slip of the tape to the capstan, and the like. This necessitates the readjustment of the capstan servo as will be seen more clearly later. Frequency shift of the capstan oscillator for the capstan motor driving signal also necessitates readjustment.

On editing the television program, electronic edition is very often resorted to nowadays, whereby a plurality of programs are contiguously recorded on a magnetic tape to form a continuous program. Electronic edition may either be assembly edition whereby a program is recorded following another previously recorded program, or insert edition whereby a program is substituted for a portion of the already recorded program. In electronic edition it is necessary to reduce the disturbance or shock which appears in the reproduced picture when the working rotary video head traverses the point of splice (the junction point between two contiguous partial programs). This requirement is met by minimizing (A) the phase difference between the video signals for the contiguous programs, (B) the shock given to the drum servo, (C) the phase difference between the control track signals for the contiguous programs, and (D) the shock given to the capstan servo at the splice point.

On carrying out insertion edition, only the video and the audio signals of the already recorded program are erased while the control track signal thereof is used to operate the capstan servo to make the rotary video heads record the new video signal, performing correct tracking along the former video tracks from which the former video signal has just been erased. This neither results in discontinuity of the control track signal at the splice point nor in shock to the capstan servo thereat.

In assembly edition, on the contrary, the already recorded program is reproduced until the splice point is reached, thereafter the video tape recorded is switched to the state of recording. This produces shock to the capstan servo as will be understood more clearly as the description proceeds.

It is therefore an object of this invention to provide a servo system for locking the phase of rotation of a motor shaft to the phase of a reference periodic signal, which is not susceptible to deviations in the reference periodic signal frequency.

It is another object of the invention to provide a servo system for locking the phase of rotation of a motor shaft to the phase of a reference periodic signal, which is not susceptible of the deviations in the nominal frequency of the motor driving oscillatory signal.

It is still another object of the invention to provide a servo system of the type described which is insusceptible to the switching of reference periodic signals from one to another.

According to this invention, there is provided a servo system for locking the phase of rotation of a motor shaft to the phase of a periodic signal, comprising a phase comparator responsive to a first signal and a second signal for producing an error signal representative of the phase difference between the first and said second signals. A frequency controllable oscillator means responsive to the control signal produces an oscillatory signal whose frequency is determined by the control signal. That said oscillatory signal frequency assumes a first nominal value that is liable to deviation when the control signal assumes a first predetermined value, the oscillatory signal driving the motor shaft. Means responsive to the periodic signal provide the first signal, means responsive to the oscillatory signal provide the second signal, and means responsive to the error signal provide the control signal. The frequency of the periodic signal has a second nominal value which is liable to deviation. The deviation of at least one of the periodic signal frequency and the second nominal value is capable of disabling the system from satisfactorily carrying out the phase locking operation. In accordance with the invention an integrator responsive to the third signal produces an integration signal proportional to the result of the integration of the signal when a signal of a second predetermined value is supplied thereto, fourth means responsive to the error signal provide the third signal. In addition, means responsive to the integration signal provide the control signal, whereby after the signal of the second predetermined value is supplied to the integrator, the system is set into its satisfactory phase locking operation.

According to one aspect of this invention, a detector/generator coupled to the motor shaft detects the phase of rotation of the motor shaft and generates a tachometer signal representative of the phase of rotation. The periodic signal is supplied to comparator means as the first signal, and the tachometer signal is applied to comparator as the second signal. A compensation servo loop locks the phase of the oscillatory signal to the phase of the periodic signal and switching means place the selected one of the main and compensation loops into the phase locking operation. The compensation loop includes the comparator the oscillator, and the integrator.

According to another aspect of this invention, the servo system further comprises a second motor shaft, a second oscillator for producing a second oscillatory signal for driving the second motor shaft, and a detector/generator coupled to the second motor shaft for detecting the second phase of rotation of the second motor shaft and for generating the periodic signal representative of the second phase of rotation. The first-mentioned oscillatory signal is supplied to the comparator means as the second signal, wherein causes the second oscillatory signal to be supplied to the comparator means as first signal until signal of second predetermined value is supplied to the integrator means.

According to still another aspect of this invention, a servo system drives a first motor shaft in such a manner that the phase of a first periodic signal may be locked to the phase of a second periodic signal, the frequencies of these first and said second periodic signals having a first and a second nominal value, respectively, which frequencies are liable to deviation.

BRIEF DESCRIPTION OF THE DRAWINGS

Referring to FIG. 1, there is shown a drum servo for a quadruplex video tape recorder which comprises in general an input terminal 11 for a television signal to be recorded, a vertical synchronizing signal separator 12 for deriving the vertical synchronizing signal V from the input video signal, and a phase adjuster 13 coupled to the output of separator 12, for adjusting the phase of the vertical synchronizing signal V for the purpose which will later become clear. The adjuster 13 may be a monostable multivibrator, a resolver, or a similar device for variably delaying the input signal. The servo further comprises a phase comparator 14 coupled to the output of phase adjuster 13, for comparing the phases of the phase-adjusted vertical synchronizing signal and the tachometer pulses T which are generated in a manner to be later described to produce an error voltage E representative of the phase difference between the two input signals. By way of example, the error voltage E becomes zero when there is no phase difference.

Figure 1:
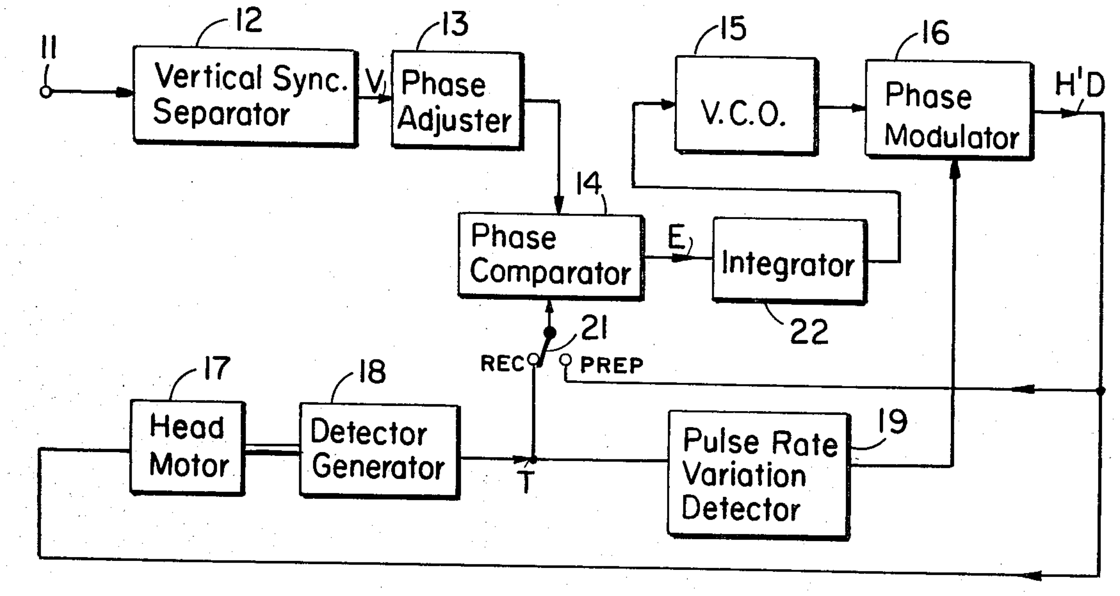
FIG. 1 is a schematic circuit diagram of a drum servo for a quadruplex video tape recorder, according to this invention.

A voltage controlled oscillator 15 receives the error voltage E from the comparator 14 as the control voltage to produce an oscillatory signal of 240 Hz when the control voltage is zero. The output of oscillator 15 is coupled to the input of, a phase modulator 16 the latter modulating the phase of the oscillatory signal for a purpose later described to derive the head motor driving signal H'D for a head motor 17 coupled to the output of phase modulator 16 and, directly coupled to the rotary video head drum (not shown). A detector/generator 18 is coupled to the head motor shaft and detects the phase of rotation of the shaft or the rotary video head drum to generate tachometer pulses T which are representative of the phase of rotation. Typically the oscillator 15 may be an LC oscillator or an astable multivibrator which produces a oscillatory signal whose frequency is dependent on the voltage of the control signal applied thereto. The motor 17 may be a synchronous motor of the hysteresis type. When the head motor driving signal frequency is 240 Hz and the vertical synchronizing signal frequency is 60 Hz, a constant phase difference prevails between the vertical synchronizing signal V and the tachometer pulses T. Under this circumstance, the phase of the vertical synchronizing signal V is adjusted by the phase adjuster 13 to make the phase comparator 14 produce zero error voltage E. A pulse rate variation detector 19 is coupled to the output of detector/generator 18 to detect the variation in the pulse rate of the tachometer pulses T, the output signal of detector 19 to the input of phase modulator 16. When the frequency of the oscillatory signal increases to accelerate the motor 17, the modulator 16 delays the phase of the motor driving signal H'D to reduce the acceleration. The damping servo loop comprising the phase modulator 16, the motor 17, the detector/generator 18, and the detector 19 thus applies damping to the motor speed variation to prevent hunting of the motor 17.

When the vertical synchronizing signal frequency deviates from 60 Hz, the drum servo must lock the speed of the head motor 17 at a frequency shifted from 240 Hz by an amount equal to four times at deviation. In order to make the oscillator 15 produce an oscillatory signal of this shifted frequency, the error voltage E must have a finite value. This means that there is a phase difference between the vertical synchronizing signal V and the tachometer pulses T. In a conventional drum servo, it is therefore necessary to readjust the phase adjuster 13.

According to this invention, the drum servo is provided with a switch 21 having a recording and a preparation fixed contact REC and PREP for supplying the tachometer pulses T and the head motor driving signal H'D to the phase comparator 14 on recording and on preparing for recording, respectively, and a compensation voltage generator or integrator 22 interposed between the output of comparator 14 and the control terminal of voltage-controlled oscillator 15 for integrating the error voltage to produce the desired compensation voltage, which is supplied to the oscillator 15 as the control voltage. The switch 21 may be an electronic switch or a set of relay contacts. As will be illustrated with reference to FIGS. 2 and 3, the compensation voltage generator 22 is in effect an integrator for producing an integration signal proportional to the result of integration. During preparation, the movable contact of the switch 21 is switched to the preparation fixed contact PREP to form a compensation servo loop which comprises an comparator 14, the integrator 22, the voltage-controlled oscillator 15, and the phase modulator 16 to set the error voltage E at zero. After the error voltage E is thus set at zero, the switch 21 is switched to the recording fixed contact REC. By virtue of the compensation servo loop which has set the error voltage E at zero during preparation and keeps the zero error voltage E so long as the vertical synchronizing signal frequency does not further deviate, the drum servo according to this invention locks the phase of rotation of the rotary heads to the phase of the vertical synchronizing signal V. Furthermore, the error voltage E is set at zero during preparation even when the nominal frequency of the oscillator 15 might have deviated due to changes caused by changes in temperature and other ambient conditions in the constants of the active and the passive circuit elements included therein. In other words, it is possible to preliminarily adjust the servo system according to this invention to lock the phase of rotation of the shaft of the motor 17 to the phase of the reference periodic signal supplied to the input terminal 11 even if there may be a deviation in at least one of the nominal frequencies of the periodic signal and of the oscillatory signal.

Figure 2:
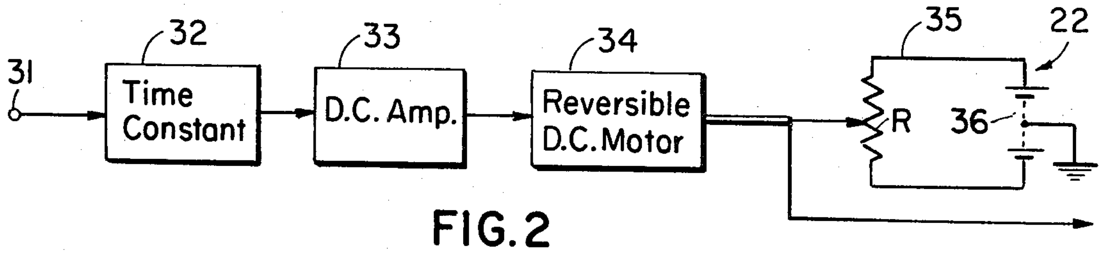
FIG. 2 is a schematic circuit diagram of an example of an integrator that may be used in the servo system according to this invention.

Referring to FIG. 2, which illustrates schematically an integrator that may be employed in the servo of FIG. 1, the integrator 22 comprises an input terminal 31 for receiving the error voltage E and a time constant circuit 32 coupled to terminal 31 for absorbing sudden changes in the error voltage E. A d.c. amplifier 33 is coupled to the output of circuit 32 for amplifying the error voltage E, and a reversible d.c. servo motor 34 is coupled to the output of amplifier 33 and is driven by the amplified error voltage, and a balance potentiometer 35 has a movable contact driven along a resistor R by the servo motor 34. So long as the error voltage E is not zero, the servo motor 34 drives the movable contact of potentiometer 35 to effect integration. After the error voltage E becomes zero, the servo motor 34 ceases to drive the movable contact to make the potentiometer 35 hold the desired compensation voltage given by a suitable choice of the voltage of a balanced power source 36 for the potentiometer 35 and of the amount of displacement of the movable contact relative to the error voltage E. Incidentally, a chopper and an a.c. servo motor (not shown) may be substituted for the d.c. amplifier 33 and the d.c. motor 34.

Figure 3:
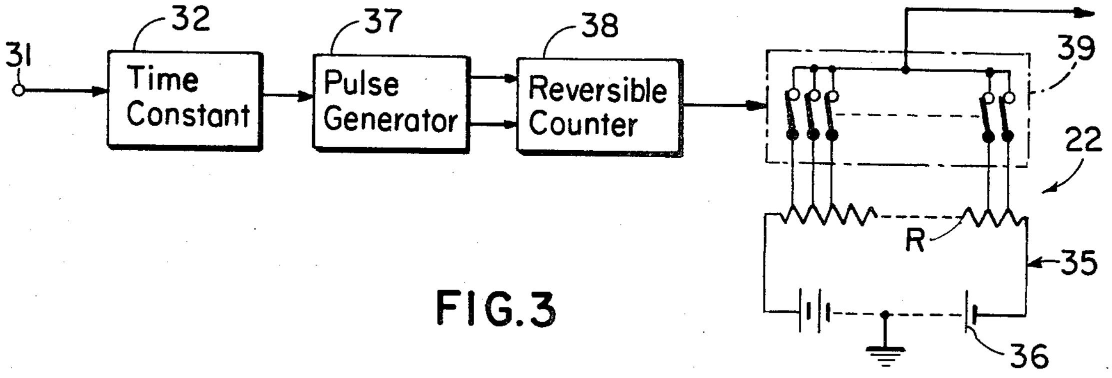
FIG. 3 is a schematic circuit diagram of another example of an integrator that may be used in the servo system according to this invention.

Referring to an alternative design for an integrator shown in FIG. 3, the integrator 22 may comprise an input terminal 31 receiving for the error voltage E, a time constant circuit 32, coupled to terminal 31, and a pulse generator 37 coupled to circuit 32 for generating a first series of pulses, a second series of pulses, and no pulses while the error voltage E is positive, negative, and zero, respectively. A reversible counter 38 coupled to the output of pulse generator 37 produces an output signal representative of the instantaneous algebraic sum of the number of the first and the second series pulses. A switching circuit 39 coupled to counter 38 selects the taps provided along a resistor R of a balanced potentiometer 35 and having a balanced power source 36 in response to the output signal of the reversible counter 38. The pulse generator 37 may comprise a conventional pulse generator, an addition gate, and a subtraction gate to produce addition pulses and subtraction pulses when the error voltage E is positive and negative, respectively. The reversible counter 38 may comprise a binary counter, a ring counter, or a shift register. When the error voltage E is positive, the output of the reversible counter 38 stepwise shifts the selected tap to derive a higher compensation voltage until the error voltage E decreases to zero due to the compensation servo loop. Alternatively, the pulse generator 37 may produce subtraction and addition pulses when the error voltage E is positive and negative, respectively.

It will now be understood that a zero voltage may be applied to the input terminal 31 of integrator 22 separately of the error signal E when it is desired to make the integrator 22 hold the instantaneous value of the integration signal, or the compensation voltage. Furthermore, the compensation voltage may be applied to the oscillator, besides the error voltage E directly supplied thereto from the comparator 14, to modify the oscillatory signal frequency.

Figure 4:
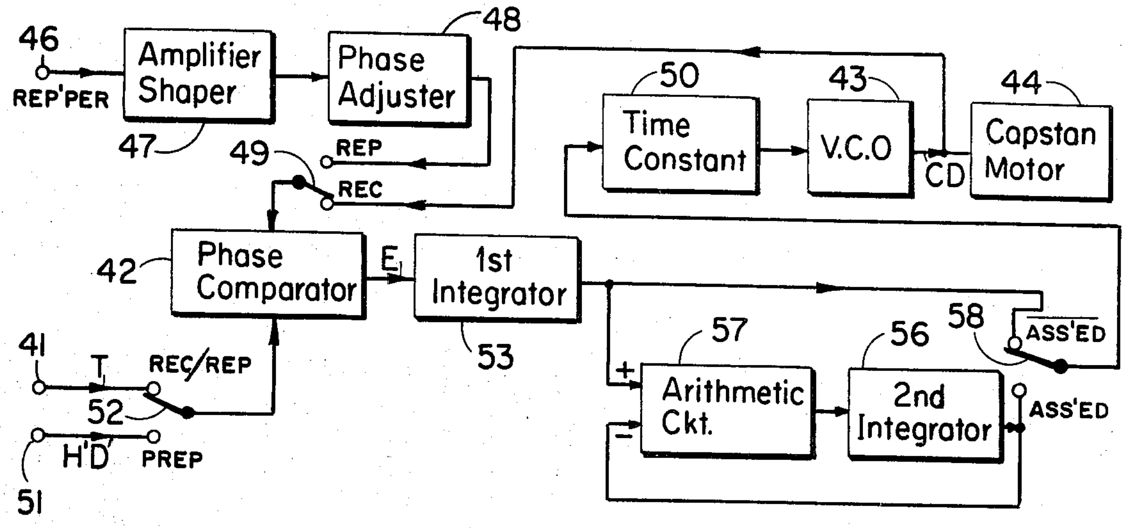
FIG. 4 is a block diagram of an example of the capstan servo according to this invention.

Referring to FIG. 4, a capstan servo for a quadruplex video tape recorder is shown which comprises in general a first input terminal 41 for receiving the tachometer pulses T generated by the detector/generator 18 shown in FIG. 1. A phase comparator 42 is coupled to terminal 41 for comparing the phases of the capstan motor driving signal C'D described later and the tachometer pulses T to derive the error voltage E representative of the phase difference. A voltage controlled oscillator 43 controlled by the error voltage E produces the oscillatory signal for driving a capstan motor 44, which may be a synchronous motor of the hysteresis type. On recording, this portion of the capstan servo drives the capstan motor 44 in synchronism with the rotary video head drum.

The capstan servo further comprises a second input terminal 46 for receiving the periodic signal REP'PER, such as the control track signal, reproduced from the control track of the recording medium (not shown) representative of the phase of the records in the video tracks (the phase of the rotary video head drum during recording of the video tracks). An amplifier/shaper 47 is coupled to terminal 46 amplifies and shapes, the reproduced periodic signal REP'PER. A phase adjuster 48 coupled to the output of amplifier/shaper 47 adjusts the phase of the reshaped periodic signal, and a first switch 49 having fixed contacts REP and REC supplies the phase-adjusted periodic signal and the capstan motor driving signal C'D to the same input terminal of the phase comparator 42 on reproduction or play back and recording, respectively. On reproduction and play back, the capstan servo drives the capstan motor 44 in such a manner that the tachometer pulses T being produced may be in phase with the phase-adjusted reproduced periodic signal. In other words, the capstan feeds the recording medium, keeping correct tracking of the rotary heads on the video tracks.

As in the case of the drum servo, a deviation in at least one of the frequencies of the tachometer pulses T and the voltage-controlled oscillatory signal of the oscillator 43 disturbs the capstan servo. A deviation in the frequency of the periodic signal recorded on the control track also brings about disturbances in the servo system. Furthermore, on interchange reproduction, the possible difference between the tape speed attained by the same capstan motor speed in different video tape recorders results in a frequency deviation of the reproduced periodic signal REP'PER, and will eventually disturb the tracking. In order to obviate such disturbances, a capstan servo according to this invention comprises a third input terminal 51 receiving for the head motor driving signal H'D, and a second switch 52 having fixed contacts REC/REP and PREP for supplying the tachometer pulses T and the head motor driving signal H'D to the same input terminal of the phase comparator 42 on recording, reproduction, or play back and preparation for such, respectively. A first integrator 53 is interposed between the comparator 42 and the oscillator 43. It will now be understood that is arrangement makes the capstan servo work satisfactorily, despite the deviation in at least one of the nominal frequencies of the vertical synchronizing signal of the television signal being recorded or reproduced, and the oscillatory signals of the oscillators 15 and 43, and in the nominal speeds of tape feed of two video tape recorders used for recording and being used on reproduction, respectively.

On assembly edition, reproduction or play back is carried out until the splice point is reached, at which time the first switch 49 is switched from the reproduction fixed contact REP to the recording fixed contact REC. Inasmuch as the capstan motor driving signal O'D is not necessarily in phase with the phase-adjusted periodic signal REP'PER, the phase comparator 42 generally produces a considerable transient error signal E to provide a shock to the rotation of the capstan motor 44. In a conventional capstan servo, a switch (not shown) is switched to temporarily supply ground to the voltage controlled oscillator 43 through a time constant circuit 50 for absorbing sudden changes in the signal supplied thereto. If the transient error voltage E is not so large, the change in the control voltage for the oscillator 43 is absorbed by the time constant circuit 50 to provide a reduced shock to the rotation of capstan motor 44. In any event, it is necessary to readjust the phase adjuster 48 to avoid disturbances of the tracking which occurs at the splice point.

According to the improvement achieved by this invention in this regard, the capstan servo is provided with a minor servo loop comprising a second integrator 56 for producing a second integration voltage and an arithmetic circuit 57 for subtracting the second integration voltage from the first integration voltage produced by the first integrator 53 to deliver the difference signal to the second integrator 56. The second integrator 56 should produce an integration voltage of the same value as the first integrator 53 in order to achieve results of integration of the same value. The minor loop sets the second integration voltage equal to the first integration voltage. The capstan servo is further provided with a third switch 58 having fixed contacts $\overline{\text{ASS'ED}}$ and ASS'ED for supplying the output signals of the first and the second integrators 53 and 56 to the time constant circuit 50 on recording and reproduction without assembly edition and for those with assembly edition, respectively. At the splice point of the assembly edition, the third switch 58 is switched to the assembly fixed contact ASS'ED to supply the second integration voltage to the time constant circuit 50 instead of the first integration voltage supplied direct thereto up to the splice point. Inasmuch as these voltages are equal, the switching gives no shock to the capstan servo. The capstan servo thus locks the tape feed at the speed before the start of recording of a new program, to maintain correct tracking.

Figure 5:
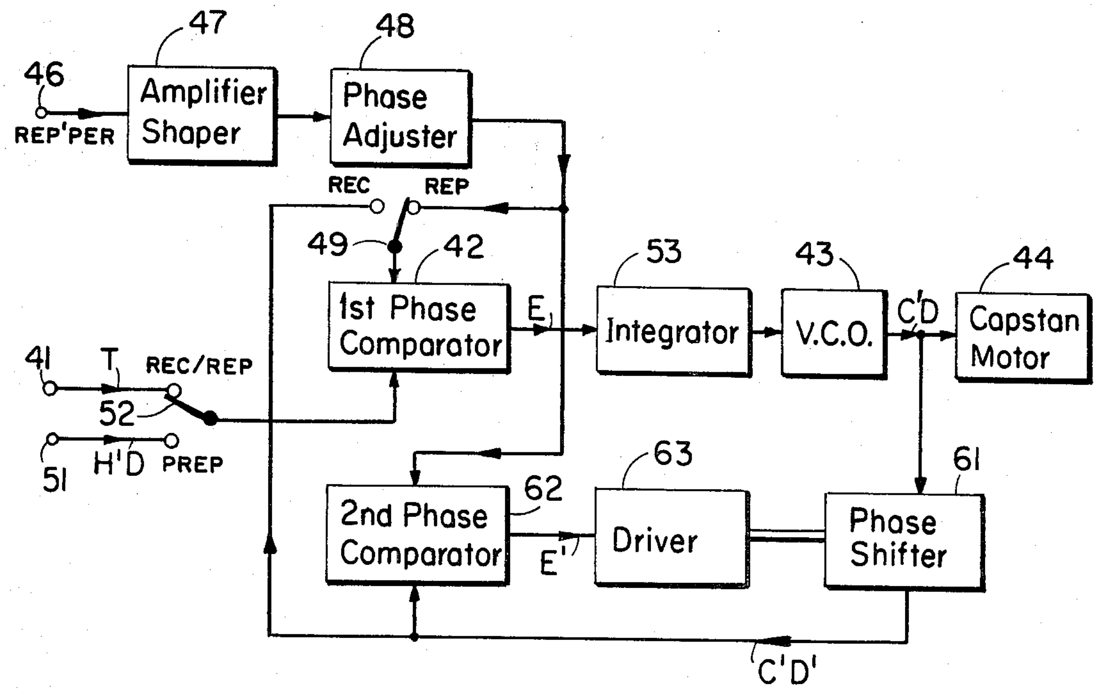
FIG. 5 is a block diagram of another example of the capstan servo according to this invention.

Referring finally to embodiment of the invention of FIG. 5, a capstan servo according to this invention comprises a first input terminal 41, a first phase comparator 42, a voltage controlled oscillator 43, a capstan motor 44, a second input terminal 46, an amplifier/shaper 47, a phase adjuster 48, a first switch 49, a third input terminal 51, a second switch 52, and an integrator 53. Unlike the capstan servo illustrated with reference to FIG. 4, the capstan servo shown in FIG. 5 comprises a minor servo loop having an adjustable phase shifter 61 coupled to the output of voltage-controlled oscillator 44 for shifting the phase of the capstan motor driving signal C'D to produce a phase-shifted capstan driving signal C'D', a second phase comparator 62 coupled to the output of phase shifter 61 compare the phases of the phase-adjusted reproduced periodic signal and the phase-shifted capstan driving signal C'D' to produce second error voltage E' representative of the phase difference, and a driver 63 coupled to the output of the second phase comparator 62 and responsive to the second error voltage E' for adjusting the phase shift produced by the phase shifter 61. The phase shifter 61 may be a pulse delay circuit or a resolver, such as a synchronous resolver or an electronic resolver. The minor loop sets the phase of the phase-shifted capstan driving signal C'D' at a value that makes the second error voltage E' zero. It is to be noted here that the phase-shifted capstan driving signal C'D' is supplied to the recording fixed contact RED of the first switch 49. Prior to switching first switch 49 to the recording fixed contact REC at the assembly edition point, the phase-shifted capstan driving signal C'D' supplied to the recording fixed contact RED is set in phase with the phase-adjusted reproduced periodic signal by the minor loop. The switching therefore does not cause shock to the capstan servo. Incidentally, the time constant circuit 50 used in the capstan servo depicted in FIG. 4 for absorbing the sudden change, if any, in the signal applied thereto is omitted in the servo described, in FIG. 5 because no switch is used following to the time constant circuit contained in the integrator 53. Also, a switch (not shown) may be placed to supply the selected one of the second error voltage E' and the reference voltage, such as ground, to the driver 63 to lock the phase shifter 61 as it provides the desired phase shift to the capstan motor driving signal C'D.

Thus, while the invention has been herein described with respect to certain preferred embodiments thereof it will be apparent that modifications may be made thereto without necessarily departing from the spirit and scope of the invention.

What is claimed is:

1. In a servo system for locking the phase of rotation of a motor shaft to the phase of a periodic signal, comprising phase comparator means responsive to a first signal and a second signal for producing an error signal representative of the phase difference between said first and said second signals, frequency controllable oscillator means responsive to a control signal for producing an oscillatory signal whose frequency is determined by said control signal, said oscillatory signal frequency assuming a first nominal value when said control signal assumes a first predetermined value, said first nominal value being liable to deviation, first means responsive to said periodic signal for providing said first signal, second means responsive to said oscillatory signal for providing said second signal, and third means responsive to said error signal for providing said control signal, the frequency of said periodic signal having a second nominal value but being liable to deviation, the frequency deviation of said periodic signal from said second nominal value disabling said system from satisfactorily carrying out the phase locking operation, the improvement which comprises:

integrator means responsive to a third signal for producing an integration signal proportional to the result of the integration of said third signal when a signal of a second predetermined value is supplied thereto, fourth means responsive to said error signal for providing said third signal, and fifth means responsive to said integration signal for providing said control signal, whereby, after said signal of said second predetermined value is supplied to said integrator means, said system is set into its satisfactory phase locking operation.

2. The servo system as claimed in claim 1, wherein said integrator means holds said instantaneous value of said integration signal when said third signal reaches said second predetermined value.

3. The servo system as claimed in claim 1, further comprising means for applying said signal of said second predetermined value to said integrator means instead of said third signal when said error signal reaches a third predetermined value.

4. The servo system as claimed in claim 2, in which said error signal assumes the value of zero when said phase difference is zero, and said second predetermined value is zero, said fifth means including means for supplying said error signal to said integrator means as said third signal and for supplying said integration signal to said oscillator means as said control signal.

5. The servo system as claimed in claim 1, in which said second means comprises detector/generator means coupled to said motor shaft for detecting said phase of rotation and for generating a tachometer signal representative of said phase of rotation, and means for supplying said tachometer signal to said comparator means as said second signal.

6. In a servo system comprising a main servo loop for locking the phase of rotation of a motor shaft to the phase of a periodic signal, said main loop having phase comparator means responsive to a first signal and a second signal for producing an error signal representative of the phase difference between said first and said second signals, frequency controllable oscillator means responsive to a control signal for producing an oscillatory signal whose frequency is determined by said control signal, the frequency of said oscillatory signal assuming a first nominal value when said control signal assumes a first predetermined value, said first nominal value being liable to deviation, said oscillatory signal driving said motor shaft, detector/generator means coupled to said motor shaft for detecting the phase of rotation of said motor shaft and for generating a tachometer signal representative of that phase of rotation, first means for supplying said periodic signal to said comparator means as said first signal, second means for supplying said tachometer signal to said comparator means as said second signal, and third means responsive to said error signal for providing said control signal, the frequency of said periodic signal having a second nominal value but being liable to deviation, the frequency deviation of said periodic signal from said second nominal value disabling said main loop from satisfactorily carrying out the phase locking operation, the improvement which comprises:

a compensation servo loop for locking the phase of said oscillatory signal to the phase of said periodic signal and switching means for placing the selected one of said main and said compensation loops into the phase locking operation, said compensation servo loop including said comparator means, said oscillator means, integrator means responsive to a third signal for producing an integration signal proportional to the result of the integration of said third signal and for holding the instantaneous value of said integration signal when a signal of a second predetermined value is supplied thereto, said first means, fourth means for supplying said oscillatory signal to said comparator means as said second signal, fifth means for supplying said error signal to said integrator means as said third signal, and sixth means responsive to said integration signal for providing said control signal, whereby, after said compensation loop accomplishes its phase locking operation to supply said signal of said second predetermined value to said integrator means, said main loop is set into its satisfactory phase locking operation.

7. The servo system as claimed in claim 1, further comprising a second motor shaft, second oscillator means for producing a second oscillatory signal for driving said second motor shaft, and detector/generator means coupled to said second motor shaft for detecting the phase of rotation of said second motor shaft and for generating said periodic signal representative of said phase of rotation, said second means supplying the first-mentioned oscillatory signal to said comparator means as said second signal, wherein said first means causes said second oscillatory signal to be supplied to said comparator means as said first signal until said signal of said second predetermined value is supplied to said integrator means.

8. The servo system as claimed in claim 7, said second means comprising feed means responsive to the rotation of said first-mentioned motor shaft for feeding a recording medium on which the previously produced periodic signal has been recorded, regenerator means responsive to the rotation of said second motor shaft for regenerating said recorded periodic signal as said recording medium is fed, means for supplying the regeneratied periodic signal to said comparator means as said second signal, and switching means for supplying said second oscillatory signal to said comprator means in place of said periodic signal until said signal of said second predetermined value is supplied to said integrator means.

9. In a servo system for driving a first motor shaft in such a manger that the phase of a first periodic signal may be locked to the phase of a second periodic signal, the frequencies of said first and said second periodic signals having a first and a second nominal value, respectively and being liable to deviation, said servo system comprising phase comparator means responsive to a first input signal and a second input signal for producing an error signal representative of the phase difference between said first and said second input signals, frequency controllable first oscillator means responsive to a control signal for producing a first oscillatory signal whose frequency is determined by said control signal, said first oscillatory signal frequency assuming a third nominal value when said control signal assumes a first predetermined value, said third nominal value being liable to deviation, said first oscillatory signal driving said first motor shaft, a second motor shaft, second oscillator means for producing a second oscillatory signal for driving said second motor shaft, detector/generator means coupled to said second motor shaft for detecting the phase of rotation of said second shaft and for generating said first periodic signal representative of said phase of rotation, periodic signal means responsive to the rotation of said first and said second motor shafts for producing said second periodic signal, first means for supplying said first periodic signal to said comparator means as said first input signal, second means for supplying said second periodic signal to said comparator means as said second input signal, and third means responsive to said error signal for providing said control signal, the deviation of at least one of said first and said second periodic signal frequencies and said third nominal value disabling said system from satisfactorily carrying out the phase locking operation, the improvement which comprises:

a compensation servo loop for locking the phase of said first oscillatory signal to the phase of said second oscillatory signal and switching means for putting the selected one of said system and said compensation loop into the phase locking operation, said compensation loop including said comparator means, said first oscillator means, integrator means responsive to a third input signal for producing an integration signal proportional to the result of the integration of said third input signal and for holding the instantaneous value of said integration signal when a signal of a second predetermined value is supplied thereto, fourth means for supplying said first oscillatory signal to said comparator means as said first input signal, fifth means for supplying said second oscillatory signal to said comparator means as said second input signal, and sixth means responsive to said error signal for providing said third input signal, whereby, after said compensation loop accomplishes its phase locking operation to supply said signal of said second predetermined value to said integrator means, said system is set into its satisfactory phase locking operation.

10. A servo system as claims in claim 1, wherein said fourth means comprises circuit means responsive to said error signal and said integration signal for deriving a difference signal representative of the difference between said error signal and said integration signal, and switching means for supplying the selected one of said difference signal and said signal of said second predetermined value to said integrator means as said third signal.

11. A servo system as claimed in claim 10, said second means comprising system switch means for supplying, in one of two steps, said oscillatory signal to said comparator means as said second signal to put said system in the first-mentioned phase locking operation and, in the other of said states, a second periodic signal to said comparator means as said second signal to make said system drive said motor shaft in such a manner that the phase of the first-mentioned periodic signal may be locked to the phase of said second periodic signal, said system switch means, upon switching between said states, being liable to bring about a sudden change in said error signal on account of the phase difference between said first and said second periodic signals to disturb the second-mentioned phase locking operation following such switching.

12. A servo system as claimed in claim 8, wherein the improvement further comprises a minor servo loop for shifting the phase of the first-mentioned oscillatory signal until the phase-shifted first oscillatory signal becomes in phase with said regenerated periodic signal, and second switching means for supplying said phase-shifted first oscillatory signal to said comparator means in place of said regenerated signal at a desired time point after said minor loop has accomplished the phase shifting operation.

* * * * *

UNITED STATES PATENT OFFICE
CERTIFICATE OF CORRECTION

Patent No. 3,668,492 Dated June 6, 1972

Inventor(s) Tatsuo Konishi and Masao Inaba

It is certified that error appears in the above-identified patent and that said Letters Patent are hereby corrected as shown below:

Column 7, Claim 1, line 67, after "deviation," the following should have appeared --said oscillatory signal driving said motor shaft,--.

Column 9, Claim 9, line 55, "manger" should have been --manner--.

Signed and sealed this 26th day of September 1972.

(SEAL)
Attest:

EDWARD M.FLETCHER,JR.
Attesting Officer

ROBERT GOTTSCHALK
Commissioner of Patents